United States Patent [19]

Harms et al.

[11] Patent Number: 5,028,073
[45] Date of Patent: Jul. 2, 1991

[54] DYNAMIC VEHICLE SUSPENSION SYSTEM INCLUDING ELECTRONICALLY COMMUTATED MOTOR

[75] Inventors: Harold B. Harms; David M. Erdman, both of Fort Wayne, Ind.

[73] Assignee: General Electric Company, Fort Wayne, Ind.

[21] Appl. No.: 461,736

[22] Filed: Jan. 8, 1990

[51] Int. Cl.$^5$ .................... B60G 1/00; B60G 3/06; B60G 23/00
[52] U.S. Cl. ............................. 280/840; 280/6.12; 280/707; 280/709; 280/690; 280/43.2; 280/693; 310/156; 74/89.15
[58] Field of Search ............ 280/840, 6.1, 6.12, 280/43.2, 688, 691, 697, 698, 702, 704, 705, 707, 709, 710, 715; 188/299; 310/80, 156; 74/89.15

[56] References Cited

U.S. PATENT DOCUMENTS

| | | | |
|---|---|---|---|
| 4,500,821 | 2/1985 | Bitting et al. | 318/254 |
| 4,555,120 | 11/1985 | Frait et al. | 280/6.1 |
| 4,790,201 | 12/1988 | Gheddo | 74/89.15 |
| 4,812,692 | 3/1989 | Arita | 310/156 |
| 4,815,575 | 3/1989 | Murty | 188/299 |
| 4,843,972 | 7/1989 | Kabilka et al. | 280/43.2 |
| 4,859,974 | 8/1989 | Kliman et al. | 335/229 |
| 4,892,328 | 1/1990 | Kurtzman et al. | 280/707 |
| 4,900,054 | 2/1990 | Kessler | 280/707 |
| 4,912,343 | 3/1990 | Stuart | 310/30 |

OTHER PUBLICATIONS

Popular Science; Jul. 1986; pp. 60–63; McCosh, D., "No-Springs, No-Shocks Suspension".
Automotive News; Aug. 7, 1989; p. 16; Keebler, J., "L. A. Firm Says Its Active Suspension Tops Lotus".
Automotive Electronic News; Mar. 27, 1989; p. 20; "Aura Patents Magnetic Suspension".
Automotive Electronic News; vol. 1, No. 17 (Sep. 11, 1989), pp. 1 and 16; Harnell, B., "Nissan to Add Active Suspension".
Automotive Electronic News; Apr. 10, 1989; Berkt Group Report; "Study: Rough Road Ahead For Active Suspension".
Automotive Electronic News; vol. 1, No. 17, Sep. 11, 1989; pp. 1 and 16; Alling, P., "Active Suspension On Some '90 'Vettes".
Automotive News OEM Edition; May 15, 1989; p. 34; Rowand, R., "Smart Suspensions".
Automotive Electronic News; Jul. 31, 1989; Body/Chassis; European Unit, "Ford Develops Semi-Active Suspension".
Machine Design; Aug. 10, 1989; p. 44; "Third Link Bushing Improve Front Suspension".
Design News; Oct. 2, 1989; pp. 104–106; Stuart, K., "Smart Suspensions For The Ideal Ride".

Primary Examiner—Charles A. Marmor
Assistant Examiner—Tamara L. Finlay
Attorney, Agent, or Firm—Ralph E. Krisher, Jr.

[57] ABSTRACT

A suspension system for controlling the relative position of a vehicle and a wheel assembly supporting the vehicle for travel over a surface of terrain. The system includes a member for resiliently connecting the vehicle and the wheel assembly to establish an equilibrium position therebetween in which the vehicle is supported in a predetermined position with respect to the surface of the terrain. The system further includes a dynamoelectric machine comprising a stationary assembly and a rotatable assembly magnetically coupled thereto, the stationary assembly having a plurality of winding stages adapted to be electrically energized to apply an electromagnetic field to said rotatable assembly thereby to rotatably drive the rotatable assembly about an axis. A ball screw translates rotation of the rotatable assembly driven by the stationary assembly into linear motion between the wheel assembly and the vehicle. A control energizes the winding stages in response to deviations of the vehicle from its predetermined position whereby the vehicle is substantially maintained at its predetermined position as the vehicle travels over the surface of the terrain.

37 Claims, 5 Drawing Sheets

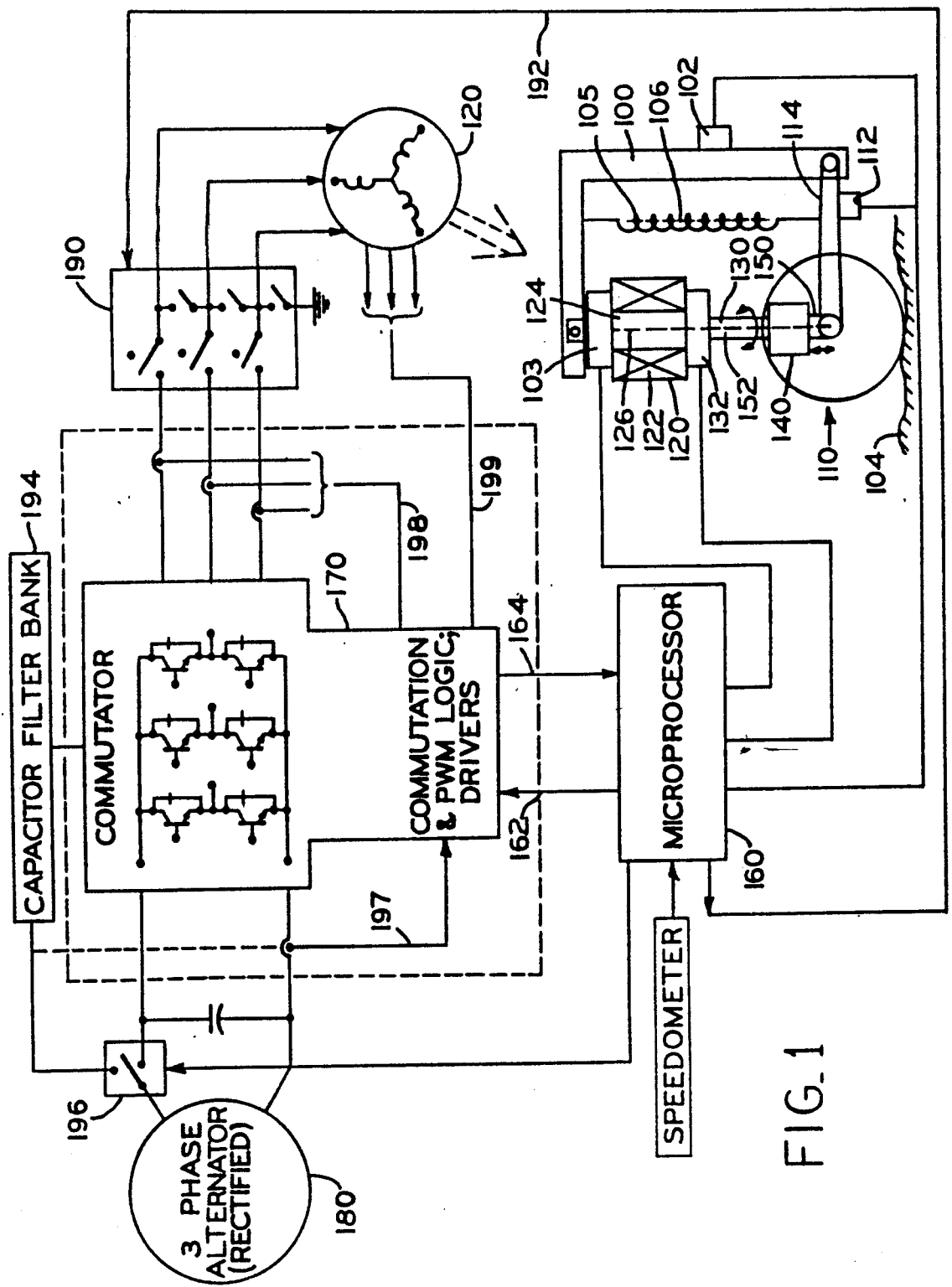
FIG_1

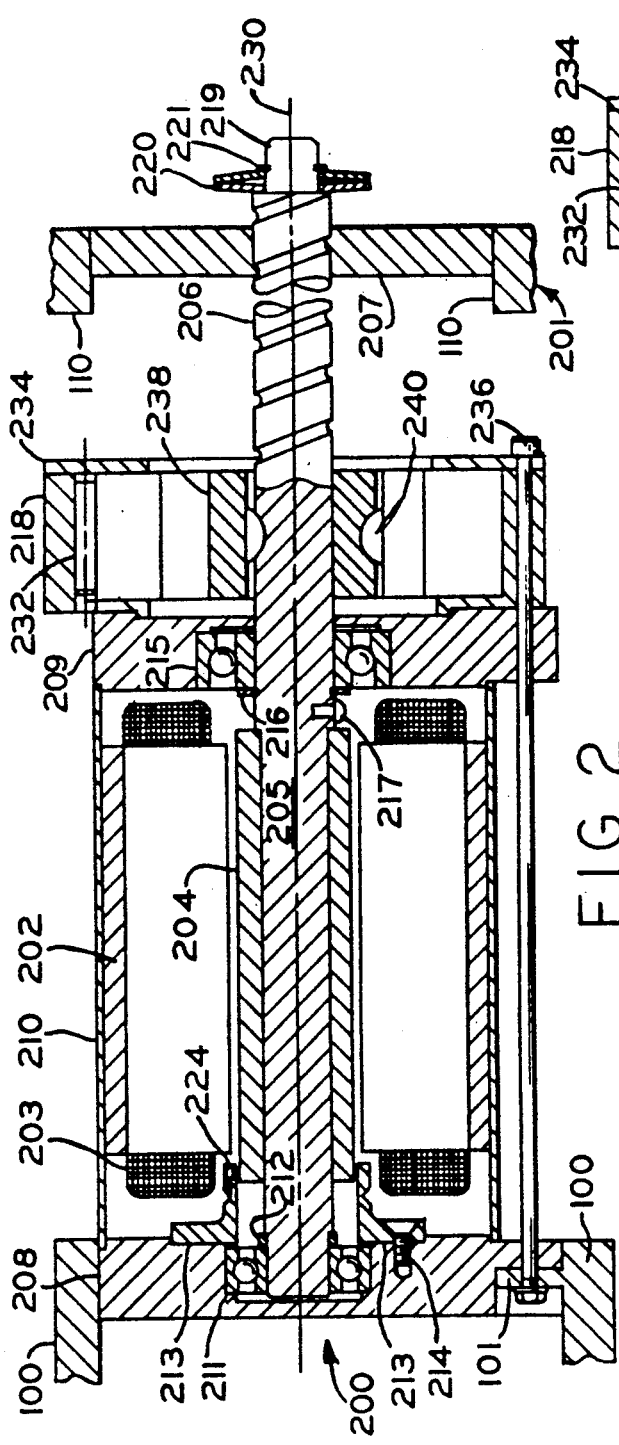
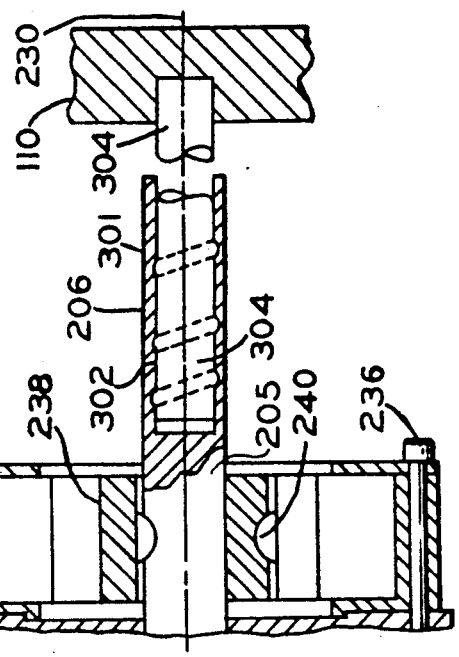
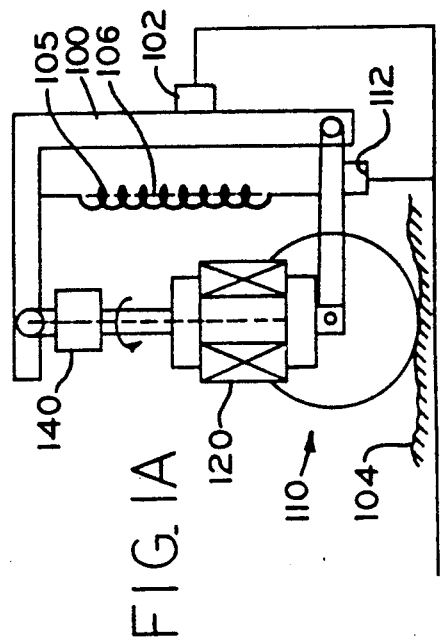

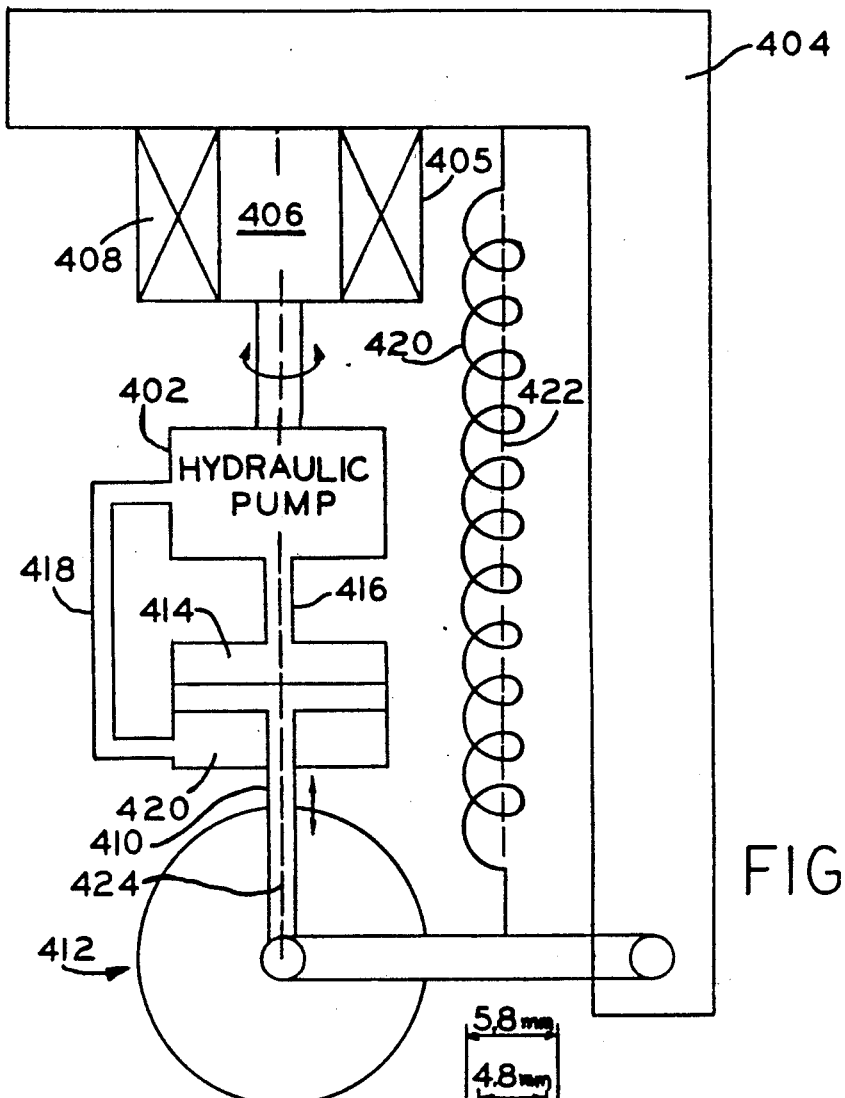
FIG_4
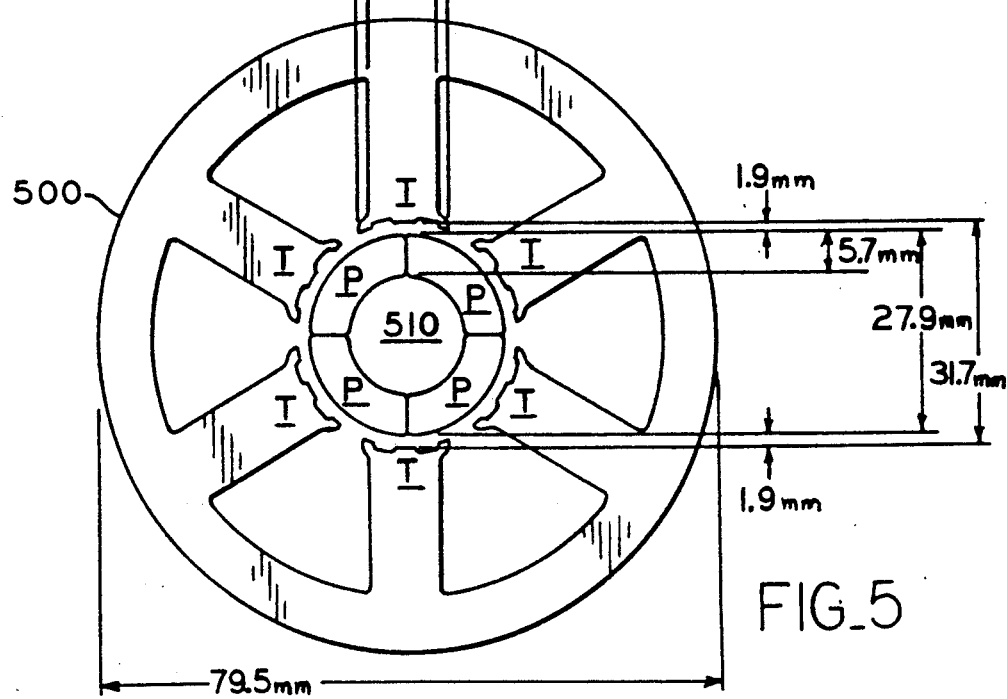
FIG_5

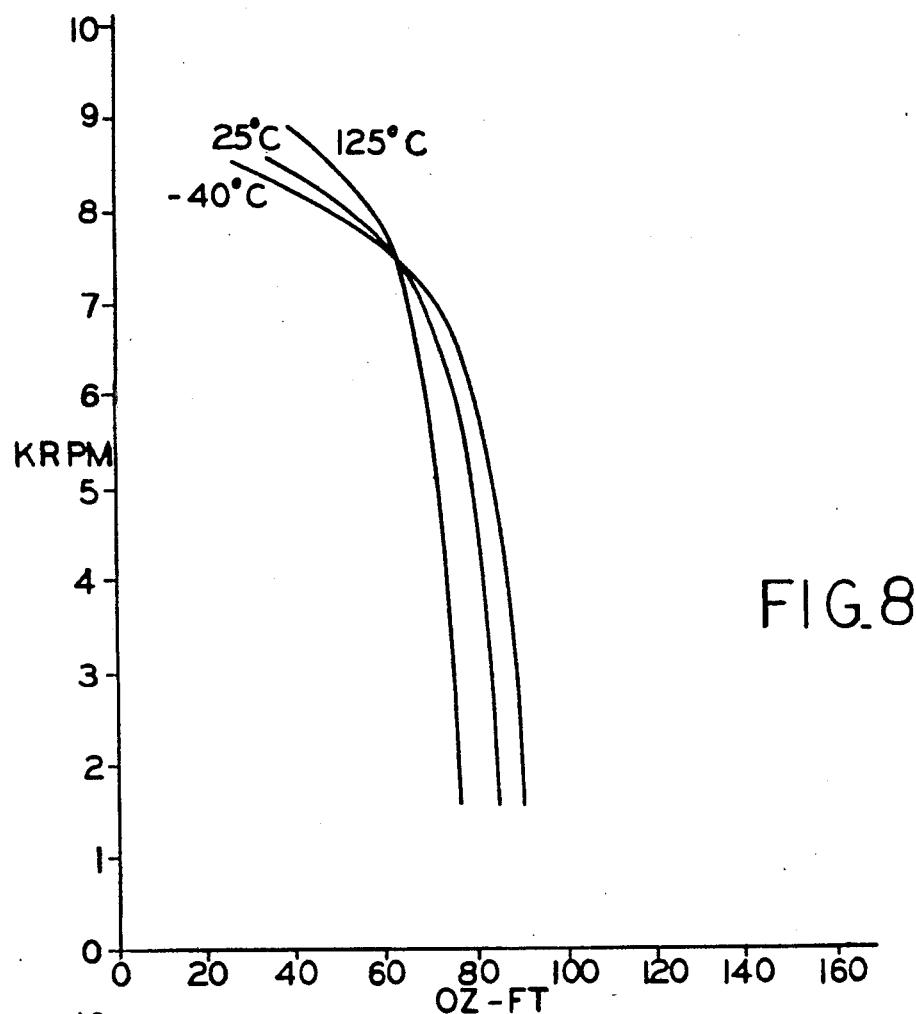
FIG. 8
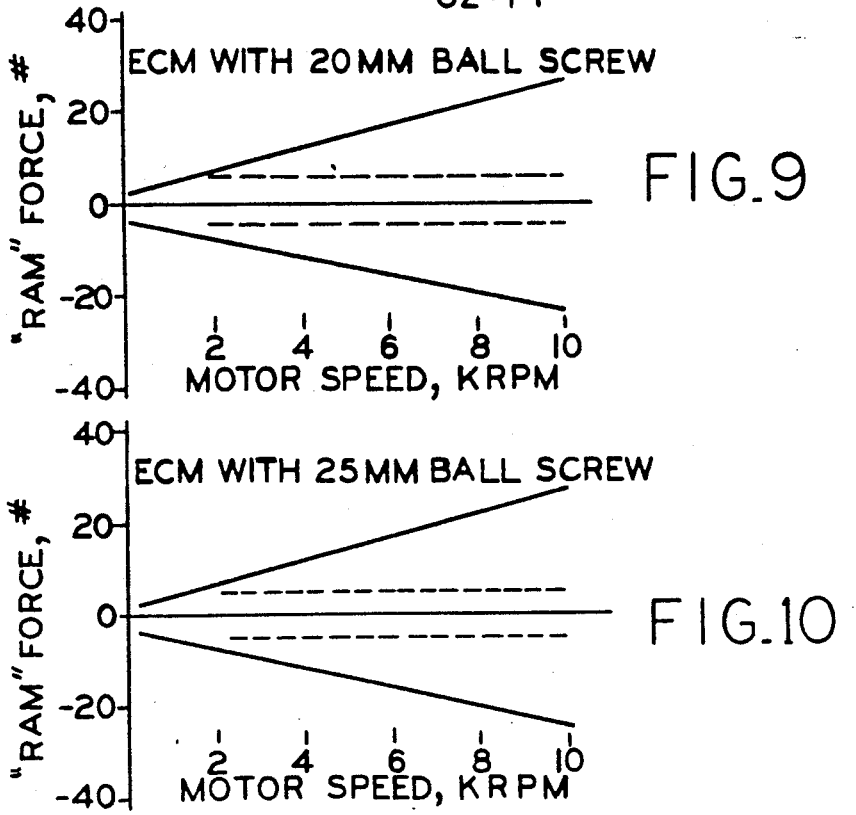
FIG. 9
FIG. 10

DYNAMIC VEHICLE SUSPENSION SYSTEM INCLUDING ELECTRONICALLY COMMUTATED MOTOR

BACKGROUND OF THE INVENTION

The automotive industry has been considering many programs to develop dynamic suspension systems. In general, such systems sense road bumps and car maneuvers by sensors used as feedback elements in adaptive electronic logic to control instantaneous power to actuate the dynamic suspension system. Hydraulic valves and rams have been considered as force actuators to raise or lower a car wheel assembly. However, these devices respond slowly, require large amounts of continuously available stand-by power, are high in cost to manufacture, and difficult to adapt for use in existing vehicle suspension systems.

SUMMARY OF THE INVENTION

It is an object of this invention to provide a dynamic vehicle suspension system which has a quick response yet does not require a significant amount of stand-by power.

It is another object of this invention to provide a dynamic vehicle suspension system which is low in cost to manufacture and which can be adapted for use in existing vehicle suspension systems.

It is another object of this invention to provide a dynamic vehicle suspension system employing a technical approach which results in high response and high peak power actuation.

It is another object of this invention to provide a dynamic vehicle suspension system employing hydraulic actuation and having rugged hydraulic parts which interface with the wheel assembly load.

It is another object of this invention to provide a dynamic vehicle suspension system which requires power only on demand, resulting in a low average power drain and which operates in both regenerating and motoring modes resulting in still lower average power drain.

It is another object of this invention to provide a dynamic vehicle suspension system which employs no valves to open or close for directing hydraulic fluid flow.

It is yet another object of this invention to provide a dynamic vehicle suspension system having a high response facilitated by high speed and physically small motor and pump components, the motor, pump and ram being integratable into a single package.

Other objects and features will be in part apparent and in part pointed out hereinafter.

BRIEF DESCRIPTION OF THE DRAWINGS

FIG. 1 is a block diagram, partially in schematic form, of one preferred embodiment of a suspension system of the invention with the stationary assembly on the vehicle.

FIG. 1A is a partial schematic drawing of the suspension system of FIG. 1 in which the stationery assembly is on the wheel assembly and the translator 140 is on the vehicle frame.

FIG. 2 is an axial cross-sectional illustration of a salient pole motor including a stationary assembly for attachment to the vehicle, the stationary assembly coupled to a rotatable assembly having a threaded shaft driving a nut on the wheel assembly.

FIG. 3 is a partial axial cross-sectional illustration of the motor of FIG. 2 including a stationary assembly for attachment to the vehicle, the stationary assembly coupled to a rotational assembly having an internally threaded shaft driving a threaded shaft on the wheel assembly.

FIG. 4 is a block diagram of another preferred embodiment of a suspension system of the invention including a hydraulic pump on the vehicle frame driving a ram on the wheel assembly.

FIG. 5 is a transverse cross-sectional illustration of a six coil, four pole motor of the invention.

FIGS. 6, 7 and 8 are graphs of motor speed in thousands of revolutions per minute along the ordinate and motor torque in ounce-feet along the abscissa of the dynamic suspension actuator performance according to the invention including an electronically commutated motor (ECM) energized at 96 V dc power and controlled by a pulse width modulating signal at 20 KHz. FIG. 6 illustrates the performance of an actuator having a distributed winding ECM driving a ball screw with a 20 mm pitch wherein the moment of inertia, including the mass of the ball screw extension, equals $J=0.53\times10^{-4}$ SlugFt$^2$ which equals 20% of the J of the reflected wheel) and the voltage constant $K_E=0.00715$ V/RPM (25° C). FIG. 7 illustrates the performance of an actuator having a distributed winding ECM driving a ball screw with a 25 mm pitch wherein the inertia, including the mass of the ball screw extension, equals $J=0.63\times10^{-4}$ SlugFt$^2$ (which equals 13.5% of the J of the reflected wheel) and $K_E=0.00715$ V/RPM (25° C). FIG. 8 illustrates the performance of an actuator having a salient pole ECM, eleven teeth per coil, driving a ball screw with a 25 mm pitch wherein the inertia, including the mass of the ball screw extension, equals $J=0.63\times10^{-4}$ SlugFt$^2$ (which equals 13.5% of the J of the reflected wheel) and $K_E=0.0088$ V/RPM (25° C.). The demagnetizing current for the salient pole motor equals 585 amperes at $-40°$ C., 427 amperes at 25° C. and 184 amperes at 125° C.

FIGS. 9 and 10 are graphs of ram force in pounds along the ordinate and motor speed in thousands of revolutions per minute along the abscissa of the force offset of electronically commutated motors having ball screws with 20 mm and 25 mm pitches, respectively, for use as part of a dynamic suspension system of the invention. The solid lines illustrate motor hysteresis and eddy current losses and the dashed lines illustrate ball screw efficiency.

Corresponding reference characters indicate corresponding parts throughout the several views of the drawings.

DETAILED DESCRIPTION OF THE PREFERRED EMBODIMENTS

Figure 6:
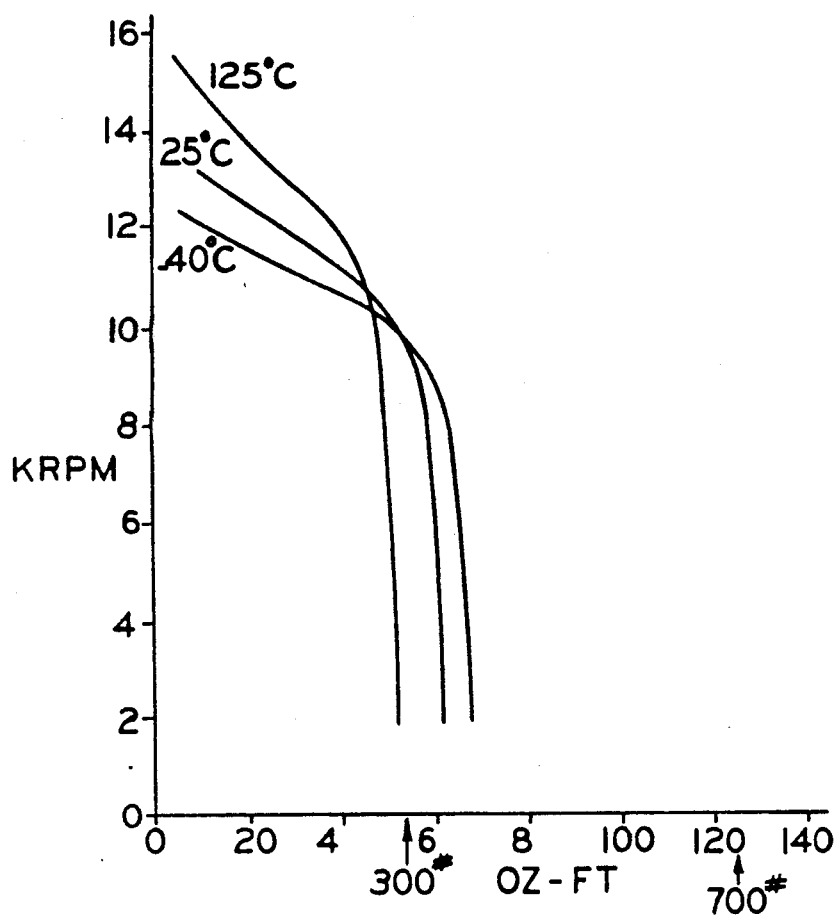

Referring to FIG. 1, one preferred embodiment of a dynamic vehicle suspension system according to the invention is illustrated in block diagram form. A vehicle frame 100 is supported for travel over a surface 104 of terrain by a wheel assembly 110 in contact with the surface 104. A spring 105 or other resilient support interconnects the vehicle frame 100 and the wheel assembly 110 along axis 106 to establish a no-force equilibrium position between the vehicle frame 100 and the wheel assembly in which the vehicle is supported in, a predetermined position with respect to the surface 104 of the terrain. The predetermined position is, preferably, the position that the vehicle frame 100 assumes with respect to the wheel assembly 110 with no external force applied to either other than the compression forces of spring 105.

In parallel with spring 105, means for mechanically, directly interconnecting the vehicle frame 100 and the wheel assembly 110 are provided. A dynamoelectric machine such as a switch reluctance motor, an electronically commutated motor or other motor referred to by reference character 120 is mounted on the vehicle frame 100 to rotate a drive shaft 130. The shaft 130 is connected to a rotary to linear motor translator 140 which is on wheel assembly 110 and moves member 150 on wheel assembly 110 linearly with respect to vehicle frame 100. Therefore, the wheel assembly 110 supports the vehicle frame 100 by connection through member 150, translator 140, shaft 130 and motor 120 mounted on the vehicle frame 100. The wheel assembly 110 may also be connected to the vehicle frame 100 directly, such as by hinged member 114.

Motor 120 includes a stationary assembly 122 magnetically coupled to a rotatable assembly 124 and having a plurality of winding stages (see FIG. 5A) adapted to be electrically energized to apply an electromagnetic field to the rotatable assembly 124 thereby to rotatably drive it in either direction. Motor 120 may also be a switched reluctance motor. The rotatable assembly 124 is coaxially connected to the drive shaft 130 along axis 152. Therefore, translator 140 constitutes means, interconnecting the rotatable assembly 124 and the wheel assembly 110, for linearly changing the relative position thereof along axis 152 in response to rotational motion of the rotatable assembly 124 caused by the stationary assembly 122. Preferably, translator 140 is constructed and arranged to relatively move the vehicle frame 100 and the wheel assembly 110 along axis 152 coaxial with axis 126 of rotation of rotatable assembly 124 and parallel to axis 106 of the spring 105.

The system includes a sensor 102 on the vehicle frame 100, a load cell or other sensor 103 between motor 120 and frame 100, and/or accelerometer 112 on the wheel assembly 110 for sensing a parameter which is a function of the position and/or movement of the vehicle frame 100 and the wheel assembly 110. In general, the sensors may be velocity sensors, acceleration sensors, horizontal position sensors, vertical position sensors, sensors which detect the relative position between the vehicle frame 100 and wheel assembly 110, inertial detectors, centrifugal force detectors, load sensors or any other type of position or movement sensor or combination thereof. For example, sensors 102 and 112 may be coils or other electromagnetically linked components which are sensitive to movement with respect to each other thereby permitting either sensor to detect its position relative to the other.

The sensors 102 and 112 provide signals to a microprocessor 160. If the sensor output signals are analog signals, the microprocessor 160 converts these signals to digital form. If the sensor output signals are digital, no conversion is necessary. Microprocessor 160 provides logic level system electronics and may also be supplied with a vehicle velocity signal and a speed and position signal provided by shaft encoder 132. The microprocessor 160 evaluates these digital signals to determine whether deviation from the equilibrium position of the vehicle frame 100 has occurred and whether any change in the relative position between the vehicle frame 100 and the vehicle assembly 110 is necessary or desirable. For example, sensors 102 and 112 may be infrared range sensors for detecting the horizontal position of the vehicle frame 100 and the wheel assembly 110, respectively, with respect to the road surface. Microprocessor 160 may be programmed to maintain the vehicle frame 100 level within certain horizontal position limits with respect to the surface 104 of the terrain. Any change in the horizontal position of the vehicle frame 100 and wheel assembly 110 would be detected by the sensors and transmitted to microprocessor 160. Such a change may be caused by the wheel assembly 110 coming, in contact with a hole or rise in the surface 104. Microprocessor 160 would in turn energize a commutation circuit 170 via line 162 to supply power to the motor 120 provided by a power supply 180. Microprocessor 160 would continue to control commutation circuit 170 to energize motor 120 to maintain the vehicle frame 110 within the horizontal limits. The commutation circuit 170 may be any standard commutation circuit known in the prior art, such as disclosed in U.S. Pat. No. 4,500,821, incorporated herein by reference, and including commutation and PWM logic and drivers. If such a circuit were used, microprocessor 160 would be programmed to provide a pulse width modulated (PWM) signal as a speed command via line 162 having a duty cycle representative of the desired speed or torque of motor 120. Accordingly, the sensors 102 and 112 and the microprocessor 160 constitute means for detecting changes in the sensed parameters as detected by the sensors. The motor 120 is preferably powered by a power supply 180 such as a three-phase rectified alternator driven by the vehicle engine. The power supply 180 and the commutation circuit 170 constitute means for energizing the winding stages as a function of changes in the parameters detected by the detecting means. As a result, the relative position of the vehicle frame 100 and the wheel assembly 110 are changed to substantially maintain the position of the vehicle within certain acceptable limits. The commutation circuit 170, microprocessor 160 and sensor constitute means for energizing the winding stages as a function of deviation from the equilibrium position so that the vehicle is substantially supported in the predetermined position as the vehicle travels over the surface of the terrain.

The microprocessor 160 may also control an array of switches 190 for controlling the mode of opertion of the motor 120. In general, it is contemplated that the motor 120 have three modes of operation: active, inactive and regenerative. In the active mode, as described above, the commutation circuit 170 is connected to the winding stages. This allows energizing of the winding stages in accordance with control signals provided by the microprocessor 160 via line 162. In the inactive mode, the winding stages are short-circuited to produce a retarding torque. Linear motion of the wheel assembly 110 with respect to the vehicle 100 is converted by translator 140 into rotary motion with rotates the rotatable assembly 124 of the motor 120. In this inactive mode, the suspension system functions like a shock absorber resisting but permitting movement of the wheel assembly 110 with respect to the vehicle 100. If the winding stages are not short-circuited, rotation of the rotatable assembly 124 caused by linear motion of the wheel assembly 110 with respect to the vehicle 100 induces an emf in the winding stages. In the regenerative mode, the induced emf is stored for later use.

In general, the switches 190 are controlled by the microprocessor 160 via line 192. In the active mode, the switches 190 are positioned to directly electrically connect the commutation circuit 170 to the winding stages of the motor 120. In the inactive mode, the switches 190 are positioned to short-circuit the winding stages of the motor 120. The inactive mode may also be used when a diagnostic signal provided via line 164 indicates that the system is not operating properly. In the regenerative mode, the switches 190 connect the commutation circuit 170 and the winding stages and the commutation circuit is controlled to directly electrically connect the winding stages of the motor 120 to a capacitor filter bank 194.

In the active mode, the microprocessor 160 also controls commutation circuit 170 which selects the power source for energizing the motor windings. Power may be supplied to the commutation circuit 170 by the power supply 180 or by the capacitor filter bank 194. The microprocessor 160 may monitor the line current or voltage of the capacitor filter bank 194 or the power supply 180 via shunt line 197, the phase currents via line 198, or the rotor position via line 199. The microprocessor 160 may also control a switch, not shown, for grounding the capacitor filter bank 194.

In operation, spring 105 maintains the relative position of the vehicle frame 100 and the wheel assembly 110 in a no-force equilibrium position. As the wheel assembly 110 encounters a hole in the road surface, the wheel assembly begins to fall into the hole and its downward vertical movement is detected by one or more sensors such as position sensor 112. The vehicle frame 100 will indirectly follow the wheel assembly 110 and also begin to move downward as detected by sensor 102. This will generate a force applied to the load cell 103 and indicated to the microprocessor 160. Microprocessor 160 evaluates the signals generated by the sensors and, in response thereto, provides a signal via line 162 to control the commutation circuit 170 to energize motor 120 to rotate shaft 130. Translator 140 converts the rotation of shaft 130 into linear motion to move support member 150 downward to maintain the vehicle frame 100 in a level position.

FIG. 2 illustrates one preferred embodiment of a motor 200 and a translator 201 according to the invention for connection between the vehicle frame 100 and the wheel assembly 110. The motor 200 comprises a stationary assembly including a core 202 having a plurality of winding stages thereon. The motor 200 also includes a rotatable assembly including a plurality of permanent magnet elements 204 peripherally spaced on a shaft 205. The shaft 205 extends out beyond the core 202 and terminates in a threaded end 206 engaged by a traveling nut 207 welded to the wheel assembly 110.

The motor 200 includes end plates 208, 209 between which a cylindrical housing 210 is positioned for supporting the stationary assembly. The end plate 208 includes a bearing 211 within which the unthreaded end of shaft 205 is journaled for rotation. A spacer 212 may be provided to maintain the position of the shaft 205 within the bearing 211. End plate 208 be provided with switch bracket 213 affixed to end plate 208 by screw 214 for supporting Hall sensors 224 for detecting the position of the shaft 205. Alternatively, the position of shaft 205 may be determined by detecting the back electromotive force (emf) of the winding stages 203. End plate 209 is also provided with a bearing 215 within which the central portion of shaft 205 is journaled for rotation. The center of the shaft may also be provided with a retaining ring 216 and rivet 217 for maintaining the position of the shaft within the housing of the motor.

End plate 209 supports end cap 218 within which the commutation circuitry may be located. A plurality of circumferentially spaced pins 232 interconnect cap 218 and retaining plate 234. A plurality of circumferentially spaced bolts 236 connect end plate 208 and retaining plate 234. Frame 100 may be welded to the stationary assembly of motor 200 or otherwise affixed thereto, such as by mounting end plate 208 to flange 101 via bolt 236. Shaft adapter 238 is positioned between retaining plate 234 and the base of end cap 218 to support shaft 205 and is held in place by key 240. Shaft 205 terminates in a reduced diameter section 219 having a disc spring 220 held in place by retaining ring 221 to prevent the traveling nut 207 from disengaging the shaft 205.

In operation, the winding stages 202 are selectively energized by the commutation circuit 170 to rotate shaft 205 in either direction. The threaded engagement between the nut 207 and the threads of shaft 205 drive the nut 207 linearly along the shaft 205 to change the relative position of the motor and the nut 207. As a result, the vehicle frame 100 attached to the motor 200 and the wheel assembly 110 attached to the nut 207 linearly change their relative positions as well. Alternatively, the stationery assembly of the motor 200 may be fixed to the wheel assembly 110 and the translator 140 may be fixed to the vehicle frame 100 as shown as FIG. 1A.

FIG. 3 illustrates an alternative embodiment of the motor and translator combination. In FIG. 3, the same reference characters as used in FIG. 2 have been employed for the same structural elements. As illustrated in FIG. 3 in partial cross-sectional form, shaft 205 terminates in an end 301 having internally threaded bore 302 which is engaged by a threaded shaft 304 on the wheel assembly 110. Shaft 304 is fixed into wheel assembly 110 to prevent axial rotation. Rotation of shaft 205 results in a linear change along axis 230 in the relative postion between shaft 205 and the shaft 304. Consequently, the relative position between the vehicle frame and the wheel assembly is also changed.

In FIG. 2 it can be seen that the stationary assembly of the motor 200 is fixed to the vehicle frame 100 and the threaded end 206 forms a screw which is an extension of the motor shaft 205. The nut 207 is fixed to the wheel assembly 110 and does not rotate. The screw rotates along with the motor, thus moving the nut 207 and the wheel assembly axially along axis of rotation 230. Alternatively, as shown in FIG. 3, it can be seen that the stationary assembly of the motor 200 is fixed to the vehicle from 100 and the end 301 of the shaft 205 forms a nut which is an extension of the motor shaft 205. The screw is formed by shaft 304 which is fixed to the wheel assembly 100 and does not rotate. The nut rotates along with the motor, thus, moving the screw and the wheel assembly axially along axis of rotation 230. The bore 304 is only partially engaged by the shaft 302, to permit the shaft 304 to move along the axis 230 in either direction.

TABLE I
DYNAMIC SUSPENSION ACTUATOR ROUND ECM MOTOR CONSTRAINTS

| Ball Screw Pitch | Max. RPM* | Motor Rotations For 7" Travel | Nom. Torque, Oz-Ft** | Max. Torque Oz-Ft*** | Reflected Inertia of 90 lb. Wheel Ass'y. Slug Ft$^2$ |
|---|---|---|---|---|---|
| 5 MM | 36,500 | 35 | 13.9 | 32.5 | $.187 \times 10^{-4}$ |
| 12 MM | 14,400 | 15 | 35.3 | 82.6 | $1.20 \times 10^{-4}$ |
| 20 MM | 9,600 | 9 | 53.1 | 123.9 | $2.71 \times 10^{-4}$ |
| 25 MM | 7,200 | 7 | 69.6 | 162.5 | $4.68 \times 10^{-4}$ |

*For 120 In/Sec. Ram Velocity
**For 300# Ram Force
***For 700# Ram Force

Table I summarizes the constraints for a round electronically commutated motor for use as a dynamic suspension actuator according to the invention. In general, the motor constraints are those dictated by the particular translator configuration. In particular, if a threaded shaft engaging a traveling nut, i.e., the ball screw structure, constitutes the translator, its mechanical limitations will determine the preferred configuration. Motor speeds and torques for four different ball screw pitches are listed in Table I. Currently available ball screws have maximum rated speeds of 10,000 rpms. This necessarily dictates an upper limit in that the ball screw pitch cannot be less than nominally 20 millimeters. The pitch, in centimeters, is defined as the distance the ball travels as a result of one rotation of the screw, or the distance between adjacent threads on the screw, i.e., $$p = \frac{1}{\text{number of threads per mm}}$$

Another motor constraint is the motor size. In general, presently available motors and rotatable assemblies therefor become physically too large to operate at speeds substantially below 7,200 rpms, which requires high torques. This constraint eliminates motors having ball screw pitches substantially greater than 25 millimeters. Therefore, it has been found that the round electronically commutated motor constraints result in the use of a motor confined to the two sets of speeds and torques associated with the ball screws having pitches within the range or 20–25 mm.

TABLE II
DYNAMIC SUSPENSION ACTUATOR ROUND ECM MOTOR SPECIFICATIONS
Salient Pole (6 Coils/4 Poles)
3 Phase Full Bridge
96V DC Power

| | Ball Screw Pitch | |
|---|---|---|
| | 20 MM | 25 MM |
| Magnet | MQ-3 (NdFeB) (30 MGOe) | MQ-3 (NdFeB) (30 MGOe) |
| Air Gap | .075" | .075" |
| Air Gap Flux Density | .63 T | .63 T |
| Approx. Back EMF Shape | Sine | Sine |
| Stator Stack Length | 3.75" | 5.0" |
| Rotor Stack Lengh | 4.25" | 5.5" |
| Turns/Coil | 6 | 6 |
| Resistance/Phase, Ohms | .013 | .015 |
| Inductance/Phase, uH | 65 | 86 |
| 150° C. Demag. Amps: | | |
| Across Slot | 168 | 168 |
| Through Magnet | 400 | 400 |
| Tooth Flux Density, Kl/In$^2$: | | |
| @ 85 Amp. | 100 | 100 |
| @ 160 Amp. | 120 | 120 |
| Ball Screw OD: | | |
| Inside Motor | .65" | .65" |
| Outside Motor | .70" | .70" |
| Inertia, Slug Ft$^2$: | | |
| Complete Rotor/Ball Ass'y | $.53 \times 10^{-4}$ | $.63 \times 10^{-4}$ |
| % of Reflected 90# Wheel Inertia | 20% | 13.5% |

Table II summarizes the round electronically commutated motor specifications for a dynamic suspension actuator according to the invention for both the 20 millimeter and 25 millimeter ball screw pitches. The motor specifications of Table II relate to a salient pole motor having six coils, one on each tooth T of the stationary assembly 500, and four poles P on the rotational assembly 510 as illustrated in FIG. 5. The Table II specifications also assume that the motor will be operated according to a three-phase, full bridge commutation circuit and that 96 volts of DC power will be provided by the power supply. Both the 20 millimeter ball screw pitch motor and the 25 millimeter ball screw pitch motor are essentially identical except for stack length as shown in Table II. The motor associated with the 20 millimeter ball screw pitch has a shorter stack length and a shorter rotor length. A salient pole construction was selected to alleviate end turn problems which can be particularly difficult for conventionally wound motors of this kind. High energy NdFeB magnets are used as the permanent magnet elements of the rotors of each of the motors to meet the commutation, saturation, demagnetizing and heat constraints of the motor.

It is preferable to use a large air gap to minimize cogging effects. These cogging effects can be particularly severe for high energy product magnets such as preferably used in the motor. The inertias indicated by Table II were calculated to include both motor rotor and ball screw extension, assuming a 0.7" diameter and 10.5" long screw.

Referring to FIG. 4, an alternative electrohydrodynamic actuator (EHA) is illustrated in block diagram form. In an EHA, a hydraulic pump 402 on vehicle frame 404 is driven by motor 405 to translate the rotary motion of the rotatable assembly 406 into linear motion. In particular, stationary assembly 408 on vehicle frame 404 drives the rotary assembly 406 to power hydraulic pump 402 and drive piston/ram 410 on wheel assembly 412. This linearly moves the piston/ram 410 thereby changing the relative position of the wheel assembly 412 with respect to the vehicle frame 404. Preferably, the hydraulic pump is a multi-piston, positive displacement type with approximately 0.09 cubic inches of total displacement. Such a pump responds instantaneously with the high pressure needed to move the ram piston and requires no reservoir of fluid. It is also able to be powered by a high speed device such as a motor generating 10,000 to 12,000 rpms. This permits the pump and motor to be physically small and permits the pump to move the ram in either direction in response to rotation in either direction. The piston/ram is configured to move in either direction according to the pressure developed on one or the other side of the piston. Rotatable assembly 406 may be rotatably driven by the stationary assembly 408 in either direction. Driving rotatable assembly 406 in one direction results in pump 402 pumping fluid from upper chamber 414, via line 416 acting as a pump inlet line, via line 418 acting as a pump outlet line, and into lower chamber 420 to drive the piston/ram upward. Alternatively, driving rotatable assembly 406 in the other direction results in pump 402 pumping fluid from lower chamber 420, via line 418 acting as a pump inlet line, via line 416 acting as a pump outlet and into upper chamber 414 to drive the piston/ram downward. As with the electrical mechanical actuator of FIGS. 2 and 3, the hydraulic pump 402 and motor 405 would be sized to meet the force and speed requirements of the dynamic suspension system according to the invention. Also, a resilient member 420 may interconnect vehicle 404 and wheel assembly 412 along axis 422, parallel to axis 424 of the EHA, to establish a no force, equilibrium position.

In any of the configurations as illustrated in FIGS. 2–4, it is contemplated that the motor must have servo quality. In addition, the motor must operate in all four quadrants and respond to position feedback signals. Preferably, the rotor inertia should be small, in the order of 10% of the reflected load inertia. It is also contemplated that regeneration energy can be dissipated as heat or stored in the capacitor filter bank, as shown in FIG. 1.

TABLE III

| | |
|---|---|
| Stator OD | = 3.13" (79.5 mm) |
| Stator ID | = 1.25" (31.7 mm) |
| Rotor OD | = 1.10" (27.9 mm) |
| Magnet Thickness | = .225" (5.7 mm) |
| Air Gap Width | = .075" (1.9 mm) |
| Tooth Width | = .23" (5.8 mm) |
| Yoke Width | = .19" (4.8 mm) |

One preferred embodiment of the motor configuration, including the dimensions shown in Table III, is shown in FIG. 5. The rotor outside diameter is limited to 1.10 inches maximum by the inertia requirements. It is believed that the outside diameter of the rotor cannot be significantly greater than 1.10 inches because of winding difficulties with the stator. The stator inside diameter can be larger and its outside diameter can remain within the 4" outside diameter space limitations if larger slots for larger wire sizes are needed to reduce copper losses.

Figure 7:
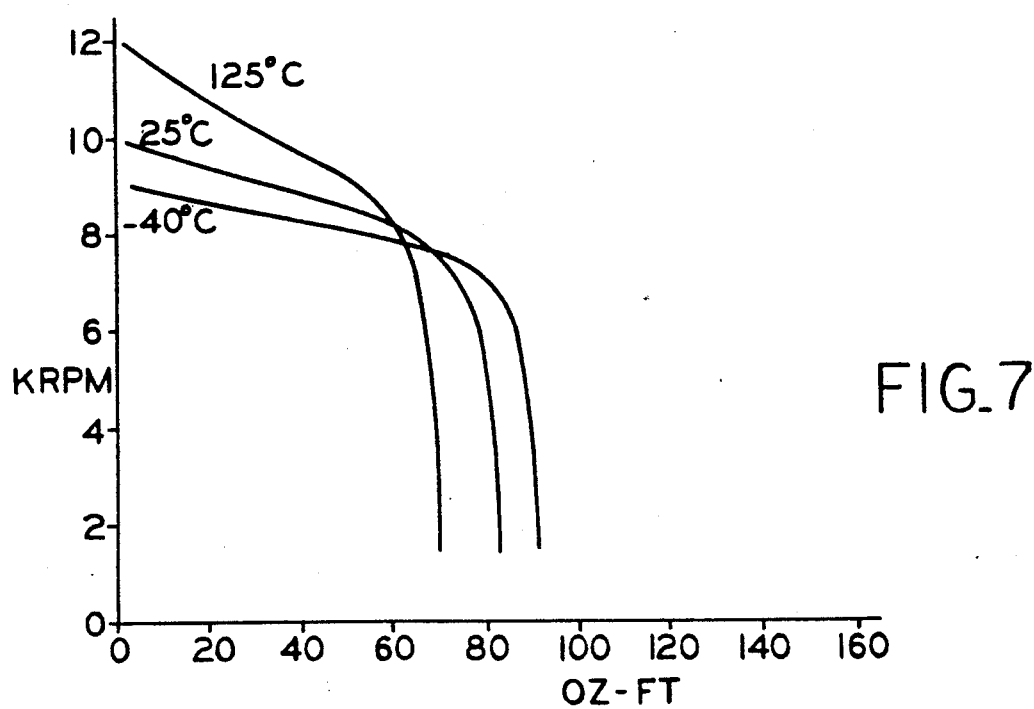

FIGS. 6 and 7 illustrate computer simulations of speed/torque performance for two motors having ball screws with pitches of 20 mm. and 25 mm., respectively, for operating temperatures in the range of $-40°$ C. to $125°$ C. An $80°$ electrical flat top of a back emf waveform and a $15°$ advance commutation angle are assumed. A $15°$ advance requires two sets of shaft position sensors, one for forward and one for reverse. Simulations for a $30°$ advance, for which just one position sensor set would be needed, suggests modest reductions but acceptable performance. FIG. 8 is similar to FIG. 7 and illustrates motor performance for slightly different parameters for the 25 millimeter ball screw pitch.

There are offset forces associated with the motor/ball screw assembly, one having to do with iron losses in the motor and the other with friction losses in the ball screw. These offset forces for the two motors are plotted in FIGS. 9 and 10. The solid line refers to the losses due to motor hysteresis and eddy currents. The dashed line refers to the losses due to ball screw efficiency. As illustrated, these offset forces are essentially the same for both motors and are inherent with a motor/ball screw assembly. Related to these offset forces is the desirable property that permanent magnet motors produce considerable retarding torque when windings are short-circuited as shown above in FIG. 1. This retarding torque forms a mode of operation which can be activated in case of a system failure to permit the suspension system to operate as a shock absorber or dynamic brake to buffer relative motion between the vehicle and its wheels caused by bumps or holes in the road surface. This mode permits the vehicle to continue operation until a repair can be made.

In view of the above, it will be seen that the several objects of the invention are achieved and other advantageous results attained.

As various changes could be made in the above constructions without departing from the scope of the invention, it is intendned that all matter contained in the above description or shown in the accompanying drawings shall be interpreted as illustrative and not in a limiting sense.

What is claimed is:

1. A suspension system for controlling the relative position of a vehicle and a wheel assembly supporting the vehicle for travel over a surface of terrain, said system comprising:

means for connecting the vehicle and the wheel assembly to establish an equilibrium position therebetween in which the vehicle is supported in a predetermined position with respect to the surface of the terrain;

a dynamoelectric machine comprising a stationary assembly and a rotatable assembly magnetically coupled thereto, said stationary assembly having a plurality of winding stages adapted to be electrically energized to apply an electromagnetic field to said rotatable assembly thereby to rotatably drive said rotatable assembly about an axis;

means for translating rotation of said rotatable assembly as driven by said stationary assembly into linear motion between the wheel assembly and the vehicle; and means responsive to deviations of the vehicle from its predetermined position for energizing the winding stages to substantially maintain the vehicle in its predetermined position as the vehicle travels over the surface of the terrain.

2. The suspension system of claim 1 wherein the connecting means resiliently connects the vehicle and the wheel assembly along an axis parallel to the axis of rotation of the rotatable assembly.

3. The suspension system of claim 2 wherein the translating means is constructed and arranged to move the wheel assembly relative to the vehicle along an axis coaxial with the axis of rotation of said rotatable assembly.

4. The suspension system of claim 3 wherein the translating means comprises a threaded shaft integral with and coaxial with said rotatable assembly, a nut coaxially engaging the threaded shaft.

5. The suspension system of claim 4 wherein said stationary assembly is on the vehicle and said nut is on the wheel assembly.

6. The suspension system of claim 4 wherein said stationary assembly is on the wheel assembly and said nut is on the vehicle.

7. The suspension system of claim 4 wherein said stationery assembly is capable of rotating said rotatable assembly at between approximately 7,000 and 10,000 revolutions per minute and said threads have a pitch in the range of from approximately 20 mm to 25 mm per revolution.

8. The suspension system of claim 3 wherein the translating means comprises a nut coaxially positioned on said rotatable assembly and a threaded shaft engaging the nut.

9. The suspension system of claim 8 wherein said stationary assembly is on the vehicle and said threaded shaft is on the wheel assembly.

10. The suspension system of claim 8 wherein said stationary assembly is on the wheel assembly and said threaded shaft is on the vehicle.

11. The suspension system of claim 8 wherein said said stationary assembly is capable of rotating said rotatable assembly at between approximately 7,000 and 10,000 revolutions per minute and said threads have a pitch in the range of from approximately 20 mm to 25 mm per revolution.

12. The suspension system of claim 8 wherein the translating means comprises a threaded shaft integral with and coaxial with said rotatable assembly and an internally threaded shaft coaxially receiving said threaded shaft.

13. The suspension system of claim 12 wherein said stationary assembly is on the vehicle and said threaded shaft is on the wheel assembly.

14. The suspension system of claim 12 wherein said stationary assembly is on the wheel assembly and said threaded shaft is on the vehicle.

15. The suspension system of claim 12 wherein said said stationary assembly is capable of rotating said rotatable assembly at between approximately 7,000 and 10,000 revolutions per minute and said threads have a pitch in the range of from approximately 20 mm to 25 mm per revolution.

16. The suspension system of claim 1 wherein the translating means comprises means for hydraulically converting rotary motion of said rotational assembly into linear motion applied to change the relative position of the vehicle and the wheel assembly.

17. The suspension system of claim 16 wherein the hydraulically converting means comprises a pump driven by said rotatable assembly and a ram driven by said pump.

18. The suspension system of claim 17 wherein said pump is on the vehicle and said ram is on the wheel assembly.

19. The suspension system of claim 17 wherein said pump is on the wheel assembly and said ram is on the vehicle.

20. The suspension system of claim 1 wherein said stationary assembly and said rotatable assembly comprise a switched reluctance motor.

21. The suspension system of claim 1 wherein said stationary assembly and said rotatable assembly comprise a salient pole electronically commutated motor.

22. The suspension system of claim 21 wherein said stationary assembly comprises six coils and said rotatable assembly comprises four radially polarized magnetic poles constructed and arranged to provide an air gap flux density of approximately 0.63 Telsa therebetween.

23. The suspension system of claim 1 wherein the total inertia of said rotatable assembly and the translating means is in the range of 5-25% of the inertia of the wheel assembly.

24. The suspension system of claim 23 wherein the total inertia of said rotatable assembly and the translating is approximately 10% of the inertia of the wheel assembly.

25. The suspension system of claim 1 further comprising means for storing regeneration energy generated by rotation of said rotatable assembly in said stationary assembly caused by relative movement of the vehicle and the wheel assembly resulting from changes in the relative position of the wheel assembly relative to the vehicle.

26. The suspension system of claim 25 wherein the storing means comprises a capacitor filter bank connected to the winding stages of said stationary assembly.

27. The suspension system of claim 1 further comprising means for detecting a failure of the suspension system and means for short circuiting said winding stages in response to failure of the suspension system.

28. A suspension actuator for controlling the relative position of a vehicle and a wheel assembly supporting the vehicle for travel over a surface of terrain, said actuator for use in combination with means for connecting the vehicle and the wheel assembly to establish an equilibrium position therebetween in which the vehicle is supported in a predetermined position with respect to the surface of the terrain, and means for sensing deviations of the vehicle from its predetermined position said actuator comprising:

a dynamoelectric machine comprising a stationary assembly and a rotatable assembly magnetically coupled thereto, said stationary assembly having a plurality of winding stages adapted to be electrically energized in response to deviations sensed by the sensing means to apply an electromagnetic field to said rotatable assembly thereby to rotatably drive said rotatable assembly about an axis; and means for translating rotation of said rotatable assembly as driven by said stationary assembly into linear motion between the wheel assembly and the vehicle whereby the vehicle is substantially maintained in its predetermined position as the vehicle travels over the surface of the terrain.

29. The suspension actuator of claim 28 wherein the connecting means comprises a resilient member connecting the vehicle and the wheel assembly along an axis parallel to the axis of rotation.

30. The suspension system of claim 29 wherein the translating means comprises a threaded shaft integral with and coaxial with said rotatable assembly, a nut coaxially engaging the threaded shaft.

31. The suspension system of claim 30 wherein said said stationary assembly is capable of rotating said rotatable assembly at between approximately 7,000 and 10,000 revolutions per minute and said threads have a pitch in the range of from approximately 20 mm to 25 mm per revolution.

32. The suspension actuator of claim 28 wherein the translating means comprises means for hydraulically converting rotary motion of said rotational assembly into linear motion applied to change the relative position of the vehicle and the wheel assembly.

33. The suspension actuator of claim 32 wherein the hydraulically converting means comprises a pump driven by said rotatable assembly and a ram driven by said pump.

34. The suspension actuator of claim 28 wherein said stationary assembly comprises six coils and said rotatable assembly comprises four radially polarized magnetic poles constructed and arranged to provide an air gap flux density of approximately 0.63 Telsa therebetween.

35. The suspension system of claim 28 further comprising means for storing regeneration energy generated by rotation of said rotatable assembly in said stationary assembly caused by relative movement of the vehicle and the wheel assembly resulting from changes in the relative position of the wheel assembly relative to the vehicle.

36. The suspension actuator of claim 28 further comprising means for detecting a failure of the suspension actuator and means for short circuiting said winding stages in response to failure of the suspension actuator.

37. A suspension system for controlling the relative position of a vehicle and a wheel assembly supporting the vehicle for travel over a surface of terrain, said system comprising:

- a resilient member connecting the vehicle and the wheel assembly along an axis to establish an equilibrium position therebetween in which the vehicle is supported in a predetermined position with respect to the surface of the terrain;
- a rotatable assembly having a threaded shaft;
- a stationary assembly on the vehicle magnetically coupled to said rotatable assembly and having a plurality of winding stages adapted to be electrically energized to apply an electromagnetic field to said rotatable assembly thereby to rotatably drive said rotatable assembly on a rotational axis parallel to the axis of the resilient member;
- a nut engaging the threaded shaft and on the wheel assembly for linearly changing the relative position of said vehicle and said wheel assembly along an axis coaxial with the rotational axis in response to rotation of said rotatable assembly as driven by said stationary assembly; and
- means responsive to deviations of the vehicle from its predetermined position for energizing the winding stages to substantially maintain the vehicle in its predetermined position as the vehicle travels over the surface of the terrain.

* * * * *